(No Model.)
T. A. EDISON.
WEBERMETER.
No. 251,558. Patented Dec. 27, 1881.
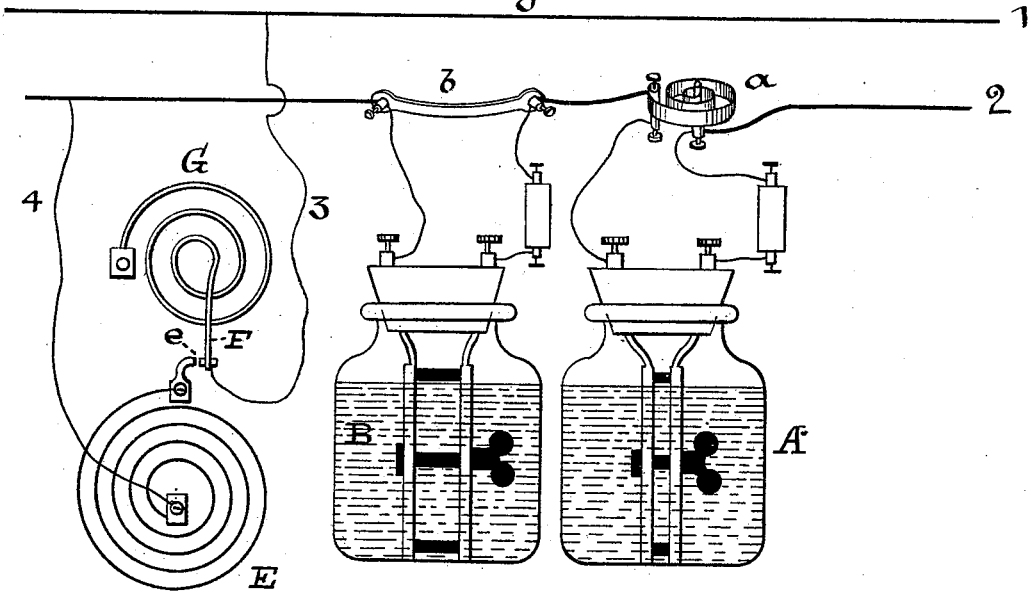
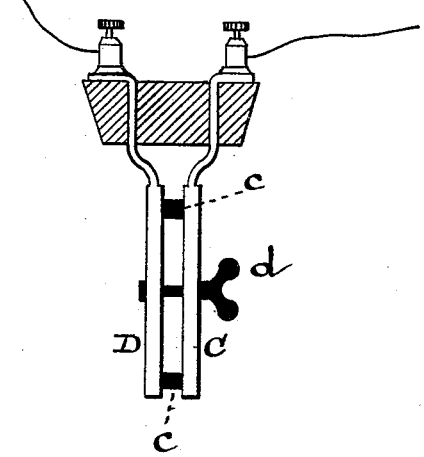
WITNESSES:
INVENTOR:
T. A. Edison
BY Dyer & Wilber
ATTORNEYS.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

WEBERMETER.

SPECIFICATION forming part of Letters Patent No. 251,558, dated December 27, 1881.

Application filed August 30, 1881. (No model.)

*To all whom it may concern:*

Be it known that I, THOMAS A. EDISON, of Menlo Park, in the county of Middlesex and State of New Jersey, have invented a new and useful Improvement in Webermeters; and I do hereby declare that the following is a full and exact description of the same, reference being had to the accompanying drawings, and to the letters of reference marked thereon.

The object of my invention is to produce a webermeter which will have the temperature within the inclosing-case so automatically regulated that the solution in the electrolytic cells cannot reach the freezing-point, which low temperature would render the cells inoperative; and, further, to so construct and arrange the plates in the cell that they may be retained securely at a definite fixed distance apart. The first object I accomplish by placing in the box which incloses the meter a carbon or metallic resistance, situated in a space common to both cells of the meter if more than one cell is used, and arranged in a derived circuit, in which is placed an automatic thermo-circuit regulator, which closes the circuit when a definite low temperature is reached—for instance, 10° above the freezing-point of the solution contained in the cell. The carbon resistance is heated by the passage of the current, but not sufficiently to be destructive of the same, and the temperature of the meter is maintained above the freezing-point of the solution.

The thermo-circuit regulator may be a spring carrying a lever on its free end, which lever is thrown by the contraction of the spring against a contact-point, completing the circuit in which the carbon resistance is placed. When the temperature rises the spring expands and the circuit is broken, and it is closed again by the fall of the temperature. The plates of the electrolytic cells are maintained at a definite distance apart by simple means. For this purpose I place between the plates blocks of non-conducting material which are of a definite thickness, representing the distance it is desired to keep the plates apart, and such plates are removably clamped upon the blocks by means of a screw, also of non-conducting material, hard rubber being suitable for this purpose. The meter is preferably provided with two cells, one of which, having its plates placed farther apart and having a smaller proportion of the current shunted through it, will deposit only a small proportion of what the first cell deposits, and may be used as a check upon the first cell.

In the drawings, Figure 1 is a view showing the arrangement of the cells and carbon resistance; Fig. 2, a separate view of the plates of one cell and the stopple-connections.

1 and 2 are the main conductors, in shunt-circuits from which are arranged the two electrolytic cells A B. The resistances $a$ $b$ (preferably of German silver) shunt portions of the current through the cells. In the shunt-circuit of the cells are fine-wire resistances which counterbalance the increase and decrease in the conductivity of the cells due to variations of the temperature. The plates C D of the cells are separated by non-conducting blocks or strips $c$, and are clamped removably upon such blocks or strips by screws $d$, of non-conducting material. The plates of cell B are placed farther apart than those of A, and the resistance $b$ is made less than $a$, so that the deposit in cell B is small in proportion to that in A. For instance, B may be arranged to deposit in six months the same amount A will deposit in one month, and B can be examined at the end of that time and used to check the accounts based on the monthly examination of A.

In the meter-box is placed the carbon resistance E, which is made of carbonized paper, or of other suitable material, or of a suitable metal. This carbon resistance is in the derived circuit 3 4, in which is also placed the lever F and contact $e$. The lever F is carried by the free end of a coiled spring, G, which is adjusted to throw F against $e$ when a certain low temperature is reached—as, for instance, ten degrees above the freezing-point of the solution.

It is obvious that instead of carbon resistance exposed to the air one of my lamps containing a filament of carbon may be used to heat the electrolytic cells.

What I claim is—

1. In an electrolytic-cell webermeter, a carbon or other resistance heated by an electric current and arranged in proximity to the cell or cells, for maintaining the temperature of the solution above the freezing-point, substantially as set forth.

2. In an electrolytic-cell webermeter, the combination of a carbon or other resistance arranged in proximity to the cell or cells, and an automatic thermo-circuit regulator for making and breaking the circuit of the resistance, substantially as set forth.

3. In an electrolytic-cell webermeter, the combination of a carbon or other resistance arranged in proximity to the cell or cells, and an automatic thermo-circuit regulator composed of a spring and contact-lever, for making and breaking the circuit of the carbon or other resistance, substantially as set forth.

4. The combination, with the plates of an electrolytic cell, of insulating blocks or strips for holding them a definite and fixed distance apart, and removable insulating-clamps for binding the plates and blocks or strips together, substantially as described.

This specification signed and witnessed this 20th day of May, 1881.

THOS. A. EDISON.

Witnesses:
RICHD. N. DYER,
H. W. SEELY.